United States Patent [19]

Winter

[11] Patent Number: 5,159,742

[45] Date of Patent: Nov. 3, 1992

[54] ROLLING MILL WITH A MULTI-ROW BEARING

[75] Inventor: Heinrich Winter, Schweinfurt, Fed. Rep. of Germany

[73] Assignee: SKF GmbH, Schweinfurt, Fed. Rep. of Germany

[21] Appl. No.: 606,702

[22] Filed: Oct. 31, 1990

[51] Int. Cl.⁵ ............................................. B21B 31/08
[52] U.S. Cl. .................................... 29/129; 384/99; 384/581; 384/906; 29/110
[58] Field of Search .......... 29/110, 116.1, 125, 29/129, 898.07; 384/99, 906, 581, 585, 571, 558; 72/236, 237

[56] References Cited

U.S. PATENT DOCUMENTS

| | | | |
|---|---|---|---|
| 3,948,577 | 4/1976 | Gamet | 384/99 |
| 4,668,105 | 5/1987 | Furukawa et al. | 384/99 |
| 4,714,359 | 12/1987 | Winter | 384/571 |
| 4,798,482 | 1/1989 | Kruk | 384/571 |
| 4,952,076 | 8/1990 | Wiley, III et al. | 384/99 |

Primary Examiner—Joseph M. Gorski
Assistant Examiner—S. Thomas Hughes
Attorney, Agent, or Firm—Eugene E. Renz, Jr.

[57] ABSTRACT

A bearing, especially for the necks on the work rolls of a rolling mill, with at least one bearing outer ring surrounding the neck, which ring has a cylindrical lateral surface in the bore of a chock, where it is supported in the direction of its radial load by way of an oil film, characterized in that the bearing outer ring has at least one recess with two boundary walls opposite each other in the circumferential direction, between which a projection, held in a fixed position with respect to the chock in the circumferential direction, narrowly engages.

10 Claims, 4 Drawing Sheets

ROLLING MILL WITH A MULTI-ROW BEARING

FIELD OF THE INVENTION

The present invention pertains to improvements in bearings, more specifically to bearings for the necks on the work rolls of a rolling mill.

BACKGROUND OF THE INVENTION

A bearing of the type indicated above is known in which the bearing outer ring is free to rotate in the cylindrical bore of the housing. This rotation is undesirable however, especially in the bearings of the work rolls of rolling mills because the bearing outer ring or rings can execute dislocation vibrations in the circumferential direction in the bore of the chock during operation. These vibrations can impair the accuracy of the rolled stock to an appreciable extent.

SUMMARY OF THE INVENTION

With the foregoing in mind, it is an object of the present invention to provide a bearing, especially for the necks on the work rolls of a rolling mill, of the indicated type in which the outer bearing ring is unable to execute any rotational motion even though its lateral surface in the bore of the chock is supported across a film of oil. In addition, the bearing is also intended to be very compact and inexpensive to produce.

In the bearing according to the present invention, at least the outer ring of a plain or roller bearing is installed in the bore of a chock of a rolling mill stand. Each bearing outer ring is prevented from rotating in the chock by projections which engage in recesses in the bearing outer ring. Each bearing outer ring is supported radially by way of an oil film at least in the area where it is subjected to load. The result is a low-vibration support for the neck in the chock even when the neck is rotating at high speed.

Furthermore, plain or roller bearings with conventional main dimensions can be compact and produced inexpensively, and such bearings according to the invention can be easily replaced.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
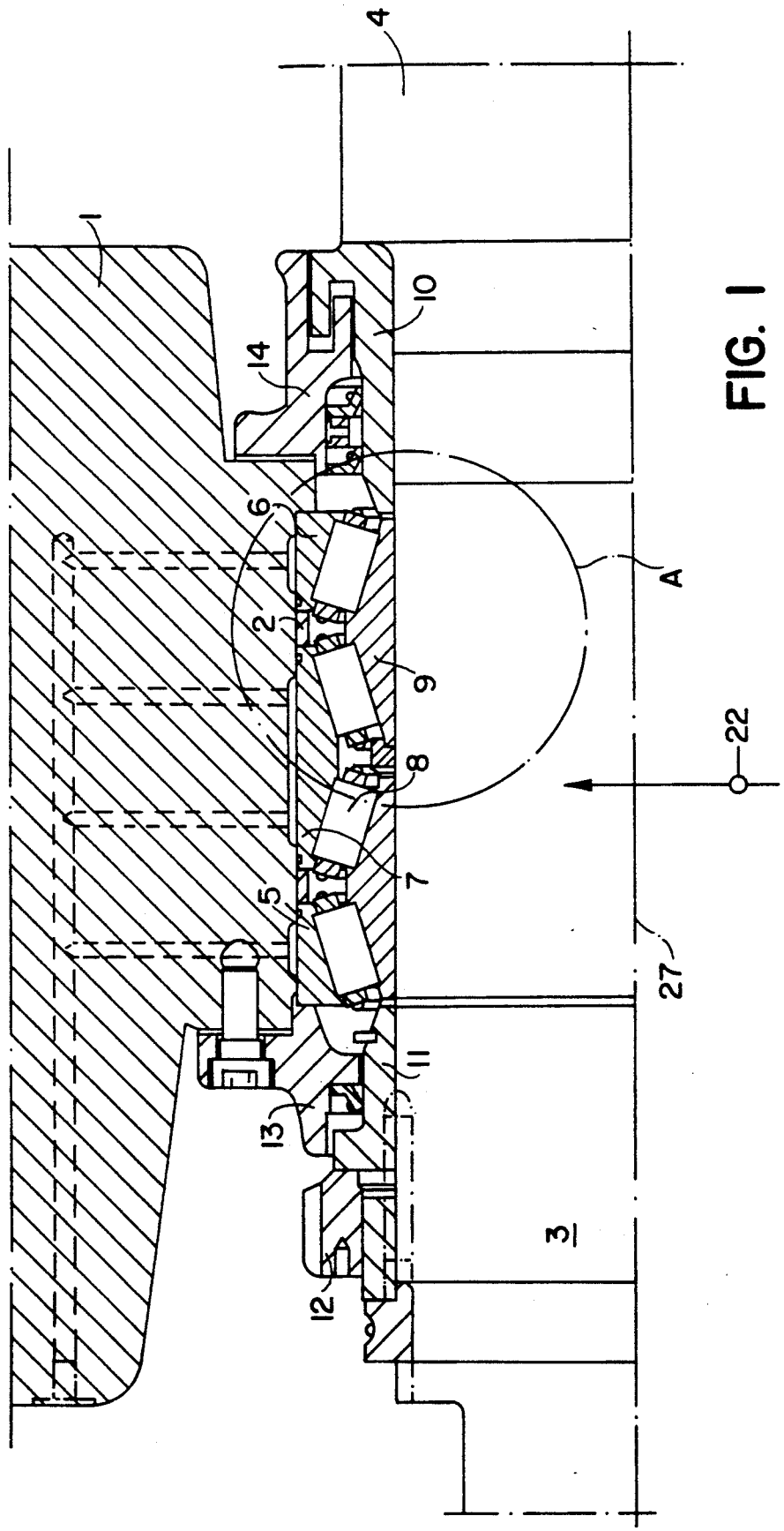
FIG. 1 shows a partial longitudinal section through a bearing according to the present invention.

The chock of a skin pass rolling mill stand (not shown) in FIG. 1 is designated 1. The chock has a cylindrical bore 2 with a four-row, laterally symmetric conical roller bearing installed therein. A neck 3 of a work roll 4 is supported in the conical roller bearing.

The conical roller bearing has two narrow outer rings 5, 6 each of which has a conical outer raceway. Between the two narrow outer rings 5, 6 there is a wide outer ring 7 with two conical outer raceways for the conical rolling elements 8. Rolling elements 8 run on the inside raceways of two wide inner rings 9 seated on neck 3. Inner rings 9 are held laterally on the neck by a labyrinth ring 10 on the work side and by a shaft nut 12 with a set collar 11 on the drive side.

Bearing outer rings 5, 6, 7 surround neck 3 of work roll 4. They are held laterally by an inner flange cover 13 on the drive side.

Figure 2:
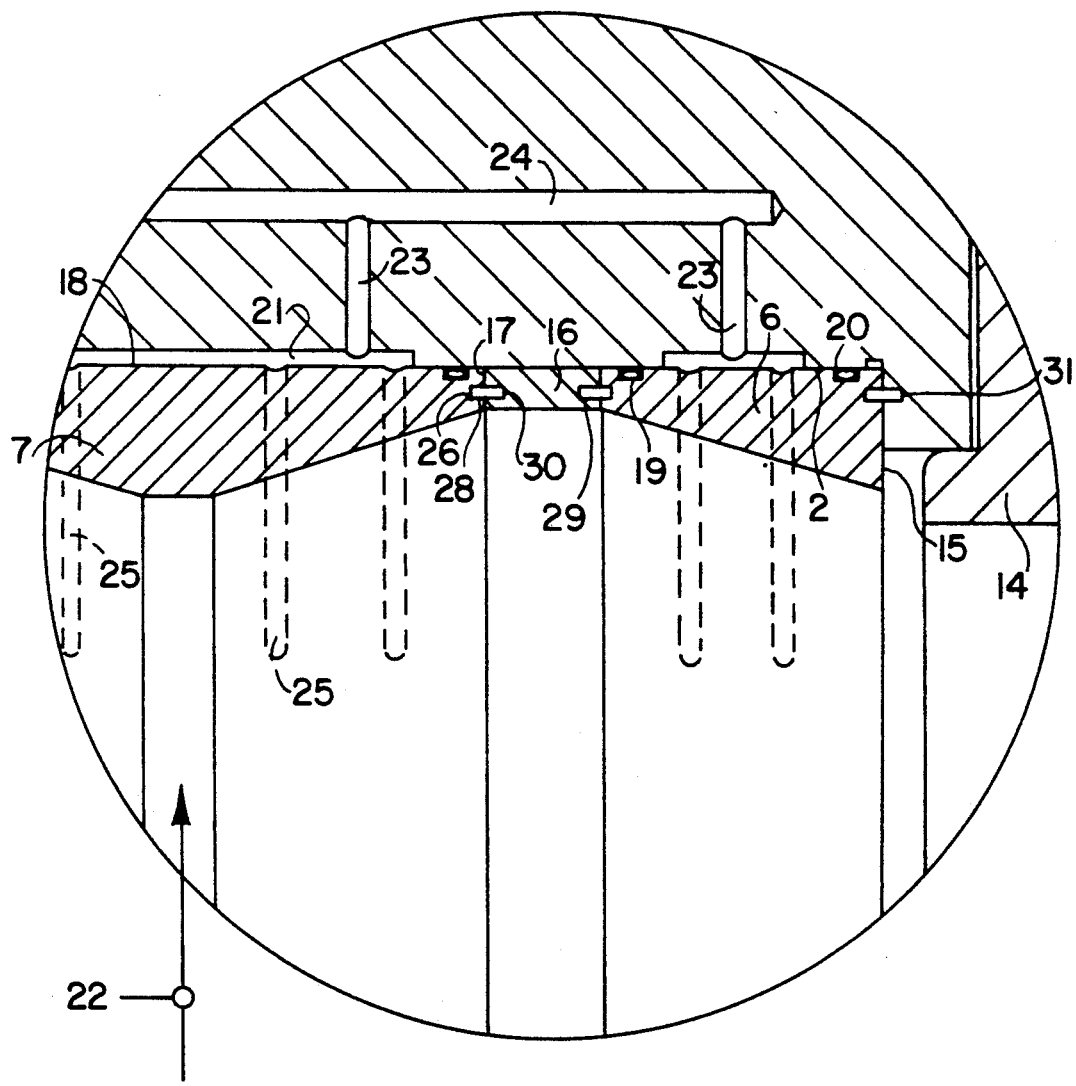
FIG. 2 shows a magnified view of the area designated "A" in FIG. 1, but without the neck, bearing inner rings, and rolling elements.

Each outer ring 5, 6, 7 has a radial end surface 15 on both sides. Between each narrow outer ring 5, 6 and wide bearing outer ring 7 there is a spacer ring 16, which also has radial end surfaces 17 (FIG. 2).

Two ring-shaped grooves 19 are machined into cylindrical lateral surface 18 of outer rings 5, 6, 7, one on each side. An elastic O-ring seal 20, which forms a lateral seal between lateral surface 18 and bore 2, is seated in each ring-shaped groove 19.

A narrow, flat longitudinal groove 21 is machined into bore 2 of chock 1 between each pair of seals 20 on each bearing outer ring 5, 6, 7, these longitudinal grooves 21 being located in the middle of the load zone on the circumference of bore 2. Longitudinal groove 21 is therefore in a longitudinal plane passing through axis 27 of neck 3, where the radial bearing loads (see direction 22) are also acting.

A radial feed hole 23, which is connected to a pressurized oil channel 24 of a lubricating oil pump ( not shown) feeds into each longitudinal groove 21.

In the load zone of lateral surface 18 there are also oil distribution grooves 25 machined in the circumferential direction. These grooves 25 ensure that the lubricating oil being pumped through longitudinal groove 21 is uniformly distributed between lateral surface 18 and bore 2 of chock 1.

Lateral surface 18 of each outer ring 5, 6, 7 is thus supported in bore 2 of chock 1 in the direction of its radial load at least partially by way of an oil film, which can be formed either as a hydrostatic pressure oil film or as a squeezed film.

In the present preferred embodiment, the pressure of the lubricating oil in oil distribution grooves 25 is so high that some of the lubricating oil escapes outward to the side across seals 20, flows between narrow outer rings 5, 6 and flange covers 13, 14, respectively, or between outer rings 5 and 7, 6 and 7 and spacer rings 16 into the interior of the conical roller bearing and thus lubricates rolling elements 8.

Each end surface 15 of outer rings 5, 6, 7 has two recesses 26, which are located in a longitudinal plane extending through axis 27 of neck 3 in direction 22 and are diametrically opposite each other. Each recess 26 has two boundary walls opposing each other in the circumferential direction, between which a projection, held in place with respect to chock 1 in the circumferential direction, narrowly engages.

In the present case, the projection is formed by one end 28 of a cylindrical pin 29. The other, opposite end 30 of cylindrical pin 29 engages in an opposing recess 31 in a connector element connected in a torsion-proof manner to chock 1. On the axially outer side of each of the two narrow outer rings 5, 6, this connector element is formed by flange covers 13, 14 and on the inner side the associated spacer ring 16.

Opposing recesses 31 are machined in the end surfaces 17 of spacer ring 16 and flange covers 13, 14 and are in each case axially opposite a recess 26.

One end 28 of each cylindrical pin 29 is seated without play in its recess 26, whereas the other opposite end 30 engages in the associated opposing recess 31 without play in the circumferential direction but with a small amount of play in the radial direction. Outer rings 5, 6, 7 can thus shift with respect to each other slightly in the direction of their radial load without cylinder pins 29 becoming jammed or overloaded.

Figure 3:
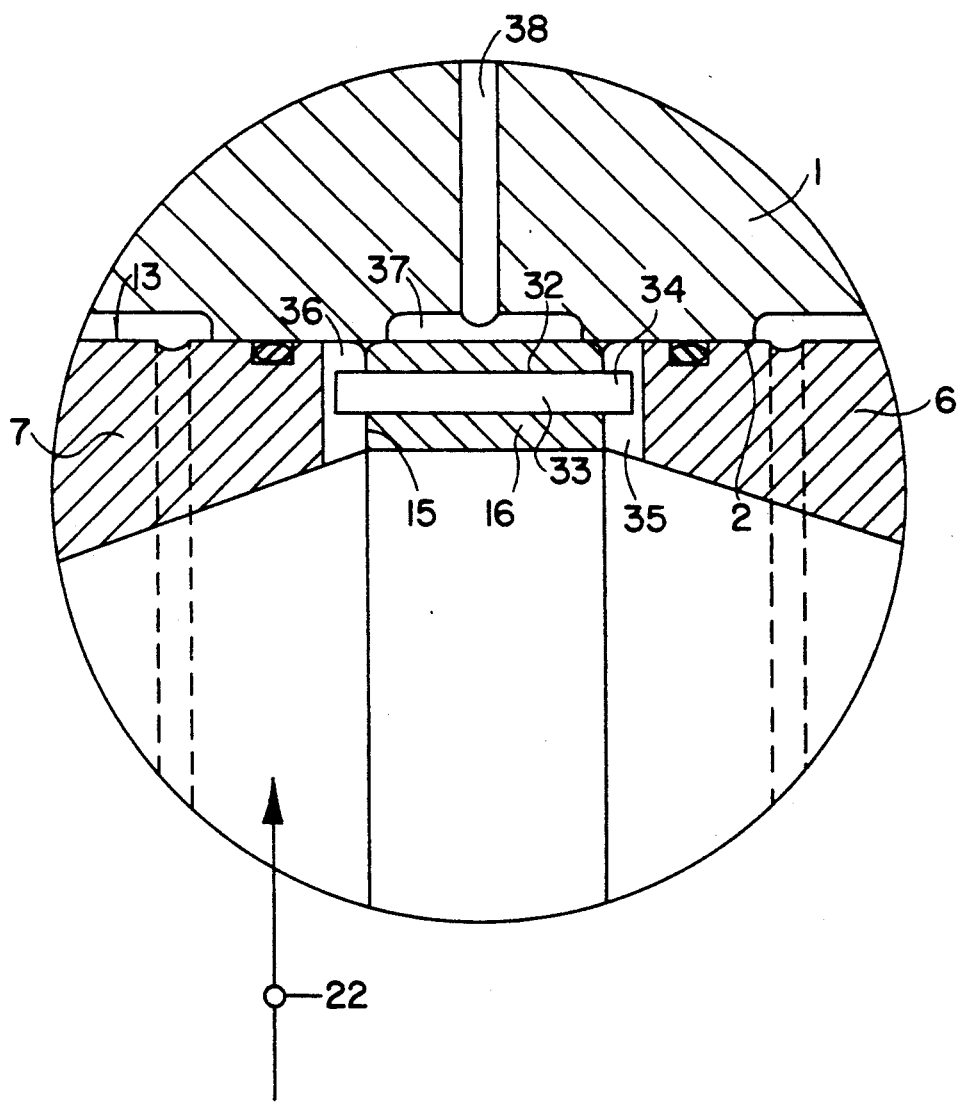
FIG. 3 shows a magnified view similar to FIG. 2 of a longitudinal section through a modified bearing without the neck, inner rings, and rolling elements.

FIG. 3 shows spacer ring 16 of a modified bearing, which has two continuous, cylindrical, opposing axial recesses 32. The two opposing recesses 32 are in a longitudinal plane extending in direction 22 and diametrically oppose each other. In each opposing recess 32 there is seated a cylindrical pin 33, which has two opposing ends 34 projecting axially beyond spacer ring 16.

Outer rings 6, 7 have two diametrically opposing, groove-like recesses 35. Each recess 35 has two flat boundary walls 36, extending in the radial direction, which oppose each other in the circumferential direction. The associated end 34 of cylindrical pin 33 fits tightly between these two boundary walls 36.

A flat, longitudinal axial groove 37 is machined in bore 2 of chock 1, and groove 37 communicates with a feed hole 38. Lubricating oil is pumped through longitudinal groove 37 via feed hole 38 and then arrives at recesses 35. From there it passes radially inward to the rolling element (not shown).

In the case of small radial relative movements of bearing outer rings 6, 7 on their oil film in the direction of their radial load, ends 34 of cylindrical pin 33 slide along radial boundary walls 36 of recess 35.

Figure 4:
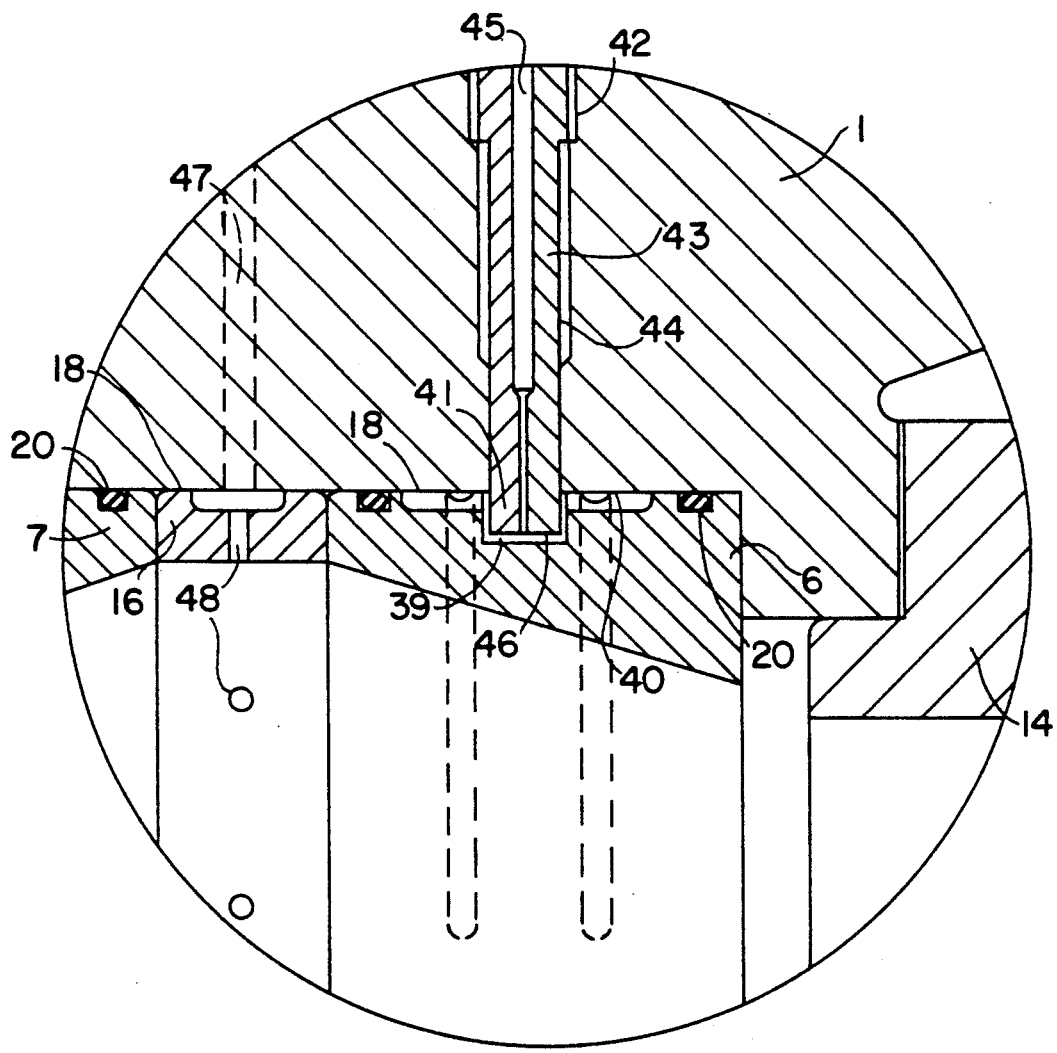
FIG. 4 shows a magnified view similar to FIG. 2 of a longitudinal section through another modified bearing without neck, inner rings, and rolling elements.

FIG. 4 shows outer ring 6 of another modified bearing, in which a cylindrical recess 39, and a flat longitudinal groove 40 which opens into said recess, are machined into lateral surface 18 of outer ring 6. Recess 39 is located in the middle of the load zone of outer ring 6, which means that it lies on a longitudinal plane extending through the axis of the neck (not shown) in the direction of the radial load of outer ring 6.

A projection, which is held in a torsion-proof manner with respect to chock 1, engages in recess 39. In the present case, the projection is formed by the inner end 41 of a pin 43, which can be tightened against lateral surface 18 by way of a threaded section 42. Pin 43 is seated in a radially oriented hole 44 in chock 1, this hole 44 being provided with a threaded section 42.

Pin 43 has a central feed hole 45, connected to a source of pressurized oil (not shown), this hole 45 having on its inner end an outlet projecting into recess 39. The outlet is located on the inner end surface 46 of pin 43.

By screwing pin 43 into a greater or lesser extended threaded section 42, end surface 46 can be tightened against 46 and the base of recess 39, so that a throttle gap is formed between end surface 46 and the base. This gap serves to throttle the flow of the pressure oil entering between bore 2 and lateral surface 18. In this way, the stiffness of the oil film between bearing outer ring 6 and chock 1 can be adjusted to the desired value. End 41 of pin 43 is guided tightly at its contact points between opposing boundary walls of recess 39 and is also lubricated with some of the pressure oil.

Little or no pressure oil escapes laterally to the outside around O-ring seal 20. For this reason, the rolling elements (not shown) are supplied with lubricating oil through a lubricating oil channel 47, which conducts the oil inward via radial through-holes 48 in spacer ring 16.

The design of the preferred embodiment as described above can be modified without leaving the scope of the invention. Therefore, outer rings for plain bearings can be used for the bearing instead of those for roller bearings.

Even though a particular embodiment of the invention has been illustrated and described herein, it is understood that changes of modifications may be made therein with the scope of the following claims.

What is claimed is:

1. A rolling mill having a work roll rotatably supported in a housing by a multi-row bearing means, said bearing means including a plurality of outer rings mounted in a bore of the housing supported in the direction of its radial load by way of an oil film means, and means for torsion-proofing said outer rings with respect to each other by projections on end surfaces of said outer rings which engage in recesses in the end surface of a respective adjacent outer ring, at least one of said rings being torsion-proofed with respect to the housing by at least one further projection engaging in a recess in the housing.

2. The rolling mill according to claim 1, characterized in that the at least one further projection is formed by one end of a pin.

3. The rolling mill according to claim 2, characterized in that another, opposing end of the pin engages in a counter-recess in a connecting element rigidly connected to the housing.

4. The rolling mill according to claim 1, characterized in that each bearing outer ring has, on at least one of its two sides, a radial end surface, in which at least one recess has been machined.

5. The rolling mill according to claim 1, characterized in that at least one of the recesses is machined into a lateral surface of a respective bearing outer ring.

6. The rolling mill according to claim 5, characterized in that a projection which engages the at least one recess of the lateral surface of the bearing outer ring is formed by the inner end of a pin, which is installed in a radial hole in the housing and which can be tightened against the lateral surface.

7. The rolling mill according to claim 1 characterized in that the pin has a central feed hole connected to a source of pressurized oil, this hole having an outlet projecting into the at least one recess of the lateral surface.

8. The rolling mill according to claim 1, characterized in that all the recesses are located in a longitudinal plane extending through the axis of the work roll in the direction of the radial load.

9. The rolling mill according to claim 8, characterized in that each engages without play in the circumferential direction and with play in the direction of the radial load.

10. The rolling mill according to claim 1 with at least two coaxial bearing outer rings situated next to each other in the bore of the housing, characterized in that, between at least two bearings outer rings, a spacer ring is installed, which is connected in a torsion-proof manner to the two bearing outer rings at each of its two end surfaces facing the associated bearing outer ring by means of the projections.

* * * * *